Sept. 23, 1969   W. RIEDL   3,468,715
FILLABLE GALVANIC BATTERY WITH ACTIVATION ARRANGEMENT
FOR THE SIMULTANEOUS INTRODUCTION OF
ELECTROLYTE INTO INDIVIDUAL CELLS Filed May 25, 1965   3 Sheets-Sheet 1

INVENTOR
WERNER RIEDL

By Erich M. H. Radde
agent

Fig. 4.
Fig. 5.
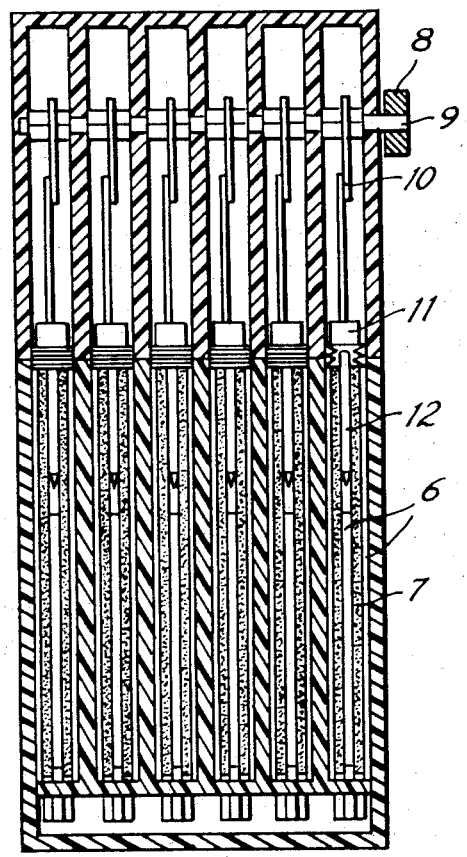
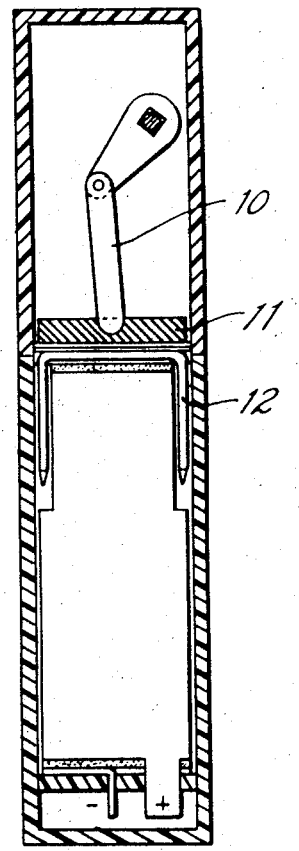
INVENTOR.
WERNER RIEDL

Sept. 23, 1969   W. RIEDL   3,468,715
FILLABLE GALVANIC BATTERY WITH ACTIVATION ARRANGEMENT
FOR THE SIMULTANEOUS INTRODUCTION OF
ELECTROLYTE INTO INDIVIDUAL CELLS
Filed May 25, 1965   3 Sheets-Sheet 3

INVENTOR.
WERNER RIEDL

United States Patent Office 3,468,715
Patented Sept. 23, 1969

3,468,715
FILLABLE GALVANIC BATTERY WITH ACTIVATION ARRANGEMENT FOR THE SIMULTANEOUS INTRODUCTION OF ELECTROLYTE INTO INDIVIDUAL CELLS
Werner Riedl, Ellwangen (Jagst), Germany, assignor to Varta Pertrix-Union G.m.b.H., Ellwangen (Jagst), Germany, a corporation of Germany
Filed May 25, 1965, Ser. No. 458,541
Claims priority, application Germany, June 27, 1964, V 26,252
Int. Cl. H01m 17/00
U.S. Cl. 136—90          8 Claims

ABSTRACT OF THE DISCLOSURE

A galvanic battery having a plurality of cells, the battery containing a thin walled plastic container which contains the electrolyte and which is destructible by the application of pressure only to enable the electrolyte to be introduced immediately before use into the battery cell. A pointed rigid member can be disposed loosely within the container.

---

Fillable galvanic batteries are known in which the fluid electrolyte and the electrodes are positioned separately within a common battery housing and in which the electrolyte is brought into contact with the electrodes as required.

These prior fillable batteries have proved unsuitable, especially in those cases in which an instantaneous saturation of the electrodes is required. The prior arrangements had the further disadvantage that the electrolyte container could not be emptied completely. Alternatively, if the position of the battery was unfavorable, a return flow of the electrolyte could occur. In consequence, the battery was unable to deliver current at full intensity at the required moment.

It is accordingly an object of the invention to overcome one or more of the above-mentioned disadvantages.

This and other objects which will appear are accomplished in accordance with the invention by storing the electrolyte of a fillable battery in a plastic container which is fully elastic on all sides and has low wall strength. At the instant of activation of the battery this container is destroyed by a mechanical device and pressed together to foil thickness. Thus, instantaneous and complete voiding of the electrolyte container is produced. The compressed electrolyte container remains in position above the cells which are thereby further sealed in. Regardless of the position of the battery, displacement of the electrolyte becomes impossible. Immediate and enduring delivery of current at full intensity is thus assured.

In many cases, it is desirable to employ an electrolyte container consisting of several compartments, each of which holds the electrolyte for a single cell. This provides a completely uniform distribution of the electrolyte liquid to the individual elements. Upon activation of series-connected cells short-circuits through the electrolyte liquid are thereby averted. A separate electrolyte container can also be provided for each series-connected cell.

The electrolyte liquid can be stored for practically unlimited periods of time in welded or glued, fully elastic foil containers embodying the invention. The introduction of the electrolyte liquid into the electrode chamber is carried out by means of a plunger movement which causes the electrolyte container to burst and displaces the liquid in the activating direction. To aid in rupturing, a U-shaped pin of non-conductive material may be enclosed, in one particular embodiment, within the fully elastic container. Upon the application of an axial force, this pin causes rupture from the inside out in the activating direction with minimum effort.

Figure 1A:
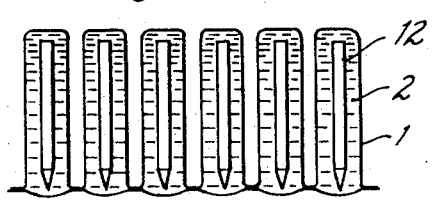
Figure 1B:
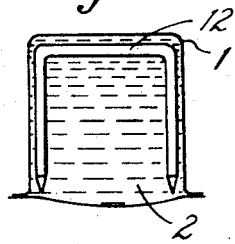
Figure 2:
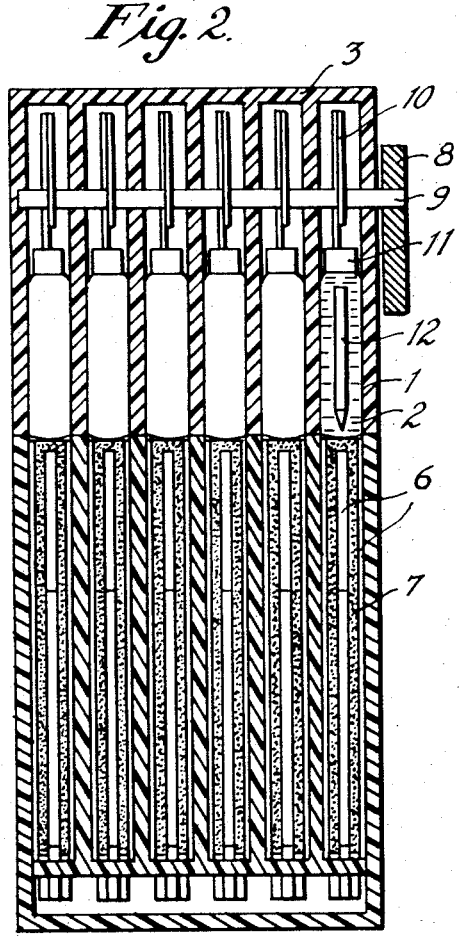
Figure 3:
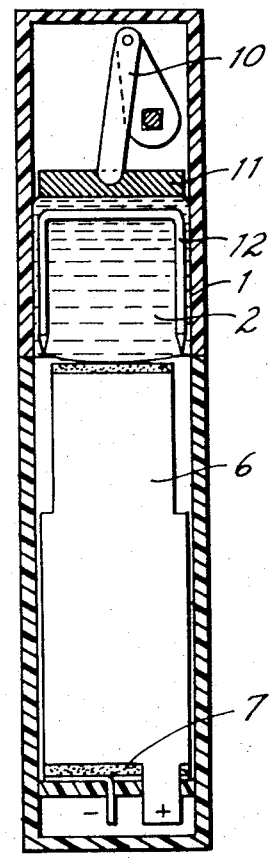
Figure 6:
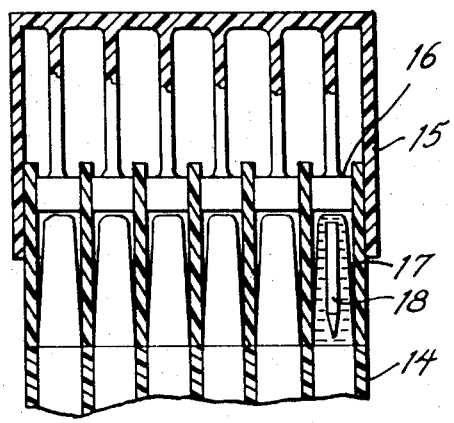
Figure 7:
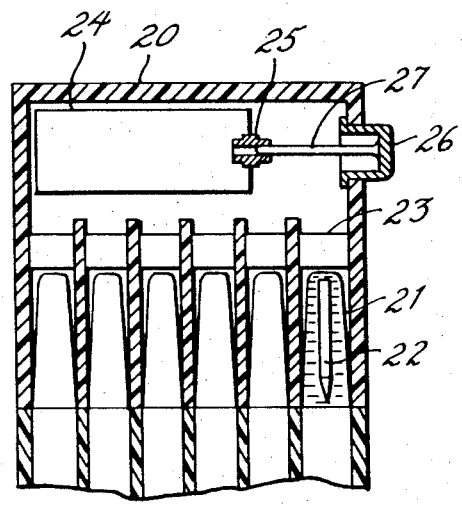

For further details, reference is made to the discussion which follows in the light of the accompanying drawings wherein:

FIGURES 1(a) and 1(b) show two mutually orthogonal views of fully elastic containers in accordance with an embodiment of this invention, FIGURES 2 and 3 show the same two views as FIGURES 1(a) and 1(b), respectively, but with the containers in place within the complete battery assemblies, FIGURES 4 and 5 show the same structures as FIGURES 2 and 3, respectively, but after activation of the battery, FIGURE 6 shows a portion of a complete battery illustrating another embodiment of the invention, and, FIGURE 7 shows a portion of a battery showing still another embodiment of the invention.

FIGURES 1(a) and 1(b), to which reference may now be had, show two mutually orthogonal views of a six-compartment electrolyte container 1. Each compartment is filled almost completely with electrolyte fluid 2. Moreover, each compartment contains a pin 12, shaped like an inverted U and pointed at both ends. The container 1 may be made of plastic material by a variety of processes and in a variety of thicknesses. For example, natural and/or synthetic rubber may be used, the compartments being formed by drawing this rubber out of a suitable suspension by means of a die dipped into the suspension. The compartments may also be made of polypropylene foil and of polyethylene and polyvinyl chloride compound foils free of softening agents which might adversely affect the electrolyte. Also, other elastic plastic materials may be used, such as foils made of combinations of polyamide and polypropylene, as well as butadiene-isoprene polymers, and the like.

Other forming methods may also be used, such as injection molding, as well as welding or glueing of thin foils into the container shapes. Moreover, all six individual compartments may be made in one operation, or else six separate compartments may be joined together.

The thicknesses of the compartments may also vary depending upon the material and the application. Thicknesses of about 0.1 to 0.3 mm. have all been found useful in practice, although the invention is not limited to these particular thicknesses.

The inverted U-shaped pins 12 may also be made of various materials and by various processes. One which has been found suitable is that of injection molding these pins of polystyrene or of polyacrylic masses, or the like.

The electrolyte containers of FIGURE 1(a) and 1(b), respectively, are shown in position within the complete battery assembly in FIGURES 2 and 3, to which reference may now be had. This battery assembly comprises a rigid battery housing 3 within which the fully elastic electrolyte containers 1 are disposed. Electrodes 6 and separators 7 are separated in the unactivated condition of the battery from the electrolyte by means of the lower wall of the container 1. The activating mechanism of the illustrated embodiment consists of a rotating switch 8, a drive shaft 9, lever linkage 10 and activating plunger 11.

FIGURES 4 and 5, to which reference may now be had, show the battery in its activated state. This was attained by actuation of rotating switch 8 which caused movement via shaft 9 of lever linkage 10 and activating plunger 11, thereby compressing electrolyte container 1. In the course of plunger movement in the activating direction, U-shaped pins 12 slit open the electrolyte container 1 from inside and the electrolyte is forced completely into the electrode spaces 6 and 7. In the terminal state of the activating motion the thin-walled electrolyte container 1 is compressed to nearly foil thickness.

FIGURE 6, to which reference may now be had, shows another arrangement for activating the battery. In this arrangement, the rigid battery case is divided into two portions 14 and 15 slideable relative to each other. A plunger 16 is rigidly attached to battery case portion 15 for each of the several electrolyte container compartments 17. These contain not only electrolyte, but also a U-shaped pin 18 for piercing the lower wall of the electrolyte container. To activate the battery of FIG. 6, the upper casing portion 15 is depressed, thereby causing pins 18 to pierce the respective container walls and again compressing the containers until they assume an appearance similar to that of containers 1 in FIGS. 4 and 5.

Still another embodiment of the invention is shown in FIG. 7, to which reference may now be had. In this embodiment there is a rigid casing 20 housing plural electrolyte containing compartments 21, each equipped with an inverted U-shaped pin 22. A plunger 23 is poised above each electrolyte containing compartment. In the headspace above plungers 23 a container 24 is disposed within which there is confined a gas at a suitably elevated pressure, such as 5 atmospheres gage, for example. This container 24 has a valve 25 connected by a pushrod 27 to a pushbutton 26 which extends through the outer wall of the battery casing 20.

To activate this battery, pushbutton 26 is pressed inwardly. This opens valve 25 and permits the gas confined within container 24 to escape into the space above plungers 23, which are thereby depressed. This, in turn, causes pins 22 to pierce containers 21 and also compresses these containers into a shape corresponding to that of containers 1 in FIGS. 4 and 5.

The battery itself may take any one of a number of conventional forms, including, for example, a positive electrode of silver chloride, a negative electrode of battery zinc alloy, and a separator of fibers on a paper or textile base, or plastic or cellulose derivatives.

I claim:
1. A fillable galvanic battery comprising a plurality of electrically interconnected battery cells into which the electrolyte is introduced immediately before use and which are enclosed together with the electrolyte storage container in a common housing, each cell having an open end for receiving electrolyte, said battery being characterized in that the electrolyte is fully contained in a container consisting of a fully elastic thin-walled plastic bag of low wall strength which is destructible and compressible in its entirety to foil thickness by the application of pressure, said bag essentially occupying the entire space above the cell and said bag having two opposite walls, one wall being located immediately adjacent and being substantially coextensive with the entire area of open ends of electrodes and separators at said open end of each cell, and said battery comprising compressing solid means within said battery but external of said container for compressing said container to foil thickness against said entire area of open ends.

2. A battery according to claim 1 further characterized in that said electrolyte container is subdivided into plural compartments, respectively containing the electrolyte for different ones of said cells.

3. A battery according to claim 2 further characterized in that a U-shaped pin capable of facilitating the rupture of the wall separating each container compartment in response to the compressing means and the open end of the corresponding cell is unconnected to and positioned loosely within each compartment.

4. A battery according to claim 2 further comprising a lever linkage system actuated by a common shaft for destroying and emptying the individual compartments of the electrolyte container.

5. The battery of claim 1 further characterized in that a pointed rigid member is disposed unconnected to and loosely within said bag.

6. The battery of claim 1 characterized in that said container has a wall thickness in the range of about 0.1 to 0.3 mm.

7. The battery of claim 1 characterized in that said container is made of a material which does not adversely affect the battery for which the electrolyte contained therein is destined.

8. The battery of claim 1 further characterized in that said container is subdivided into plural compartments by means of plastic material similar to that forming other portions of said container.

References Cited
UNITED STATES PATENTS 1,218,847    3/1917    Firey _____ 136—90

FOREIGN PATENTS 768,188    2/1957    Great Britain.
1,093,523    3/1959    France.

WINSTON A. DOUGLAS, Primary Examiner
A. SKAPARS, Assistant Examiner

U.S. Cl. X.R.
136—113